No. 682,789. Patented Sept. 17, 1901.
C. S. CARKIN.
HOOF PAD.
(Application filed Dec. 10, 1900.)
(No Model.)
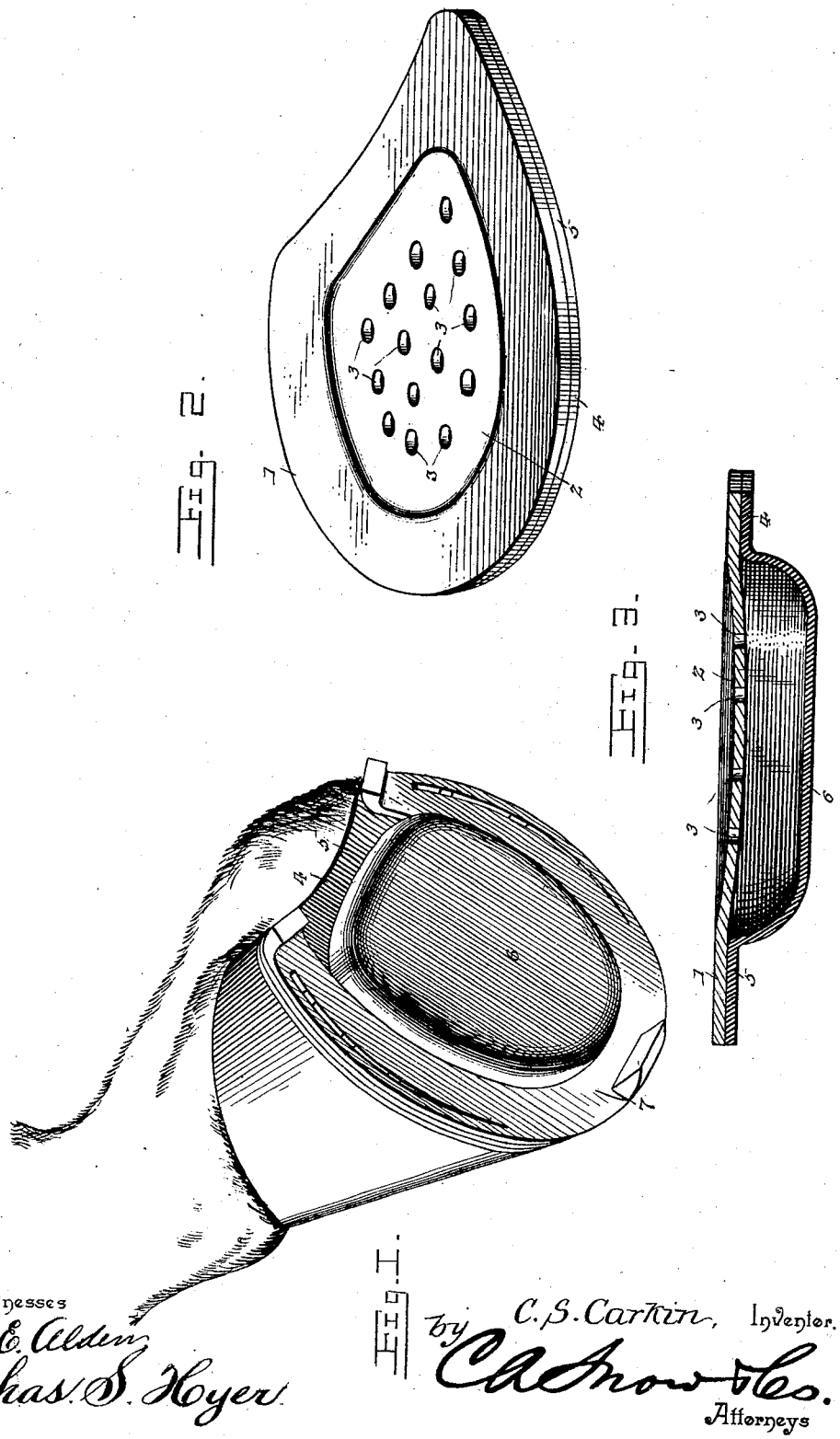

UNITED STATES PATENT OFFICE.

CHARLES S. CARKIN, OF KEENE, NEW HAMPSHIRE.

HOOF-PAD.

SPECIFICATION forming part of Letters Patent No. 682,789, dated September 17, 1901.

Application filed December 10, 1900. Serial No. 39,372. (No model.)

*To all whom it may concern:*

Be it known that I, CHARLES S. CARKIN, a citizen of the United States, residing at Keene, in the county of Cheshire and State of New Hampshire, have invented a new and useful Hoof-Pad, of which the following is a specification.

This invention relates to hoof-pads; and the object of the same is to provide a simple and effective device of this character comprising an automatically-distending cushion covering the frog and bottom of a hoof inside the line of the shoe to prevent balling and filling up of the same, particularly in winter, and also to absorb the concussion of the feet of the horse in traveling, the improved pad permitting the use of an ordinary shoe with calks to prevent slipping.

The invention consists in the construction and arrangement of the several parts, which will be more fully hereinafter described and claimed.

In the drawings, Figure 1 is a perspective view of a hoof and portion of a horse's limb, showing the improved pad applied in operative position. Fig. 2 is a detail perspective view of the improved pad looking toward the top thereof. Fig. 3 is a longitudinal vertical section of the same.

Similar numerals of reference are employed to indicate corresponding parts in the several views.

The numeral 1 designates an upper layer or thickness of leather or other suitable material which is shaped to provide a peripheral-edge contour conforming to that of the hoof to which it is applied. The intermediate portion of said layer is formed with a depression or cavity 2 to fit over the inner or frog portion of the hoof, and the leather or other material inwardly from the margin of said cavity is provided with a plurality of openings 3. The marginal portion 4 of a layer or suitable thickness 5 of rubber or rubber compound is firmly secured to the under side of the layer 1 around the location of the cavity or depression 2, and below the latter the layer or thickness 5 is left sufficiently full or primarily shaped to form a hollow depending pad 6, which is adapted to lie within the line of the inner edge of a horseshoe and be free to collapse and distend. The top portion of the layer 1 is disposed against the bottom of the hoof and the air is forced into the pad 6 through the openings 3 by said operation. The shoe 7 is then placed on the marginal portion 4 of the layer or thickness 5 and secured in the ordinary manner by nails, which are driven through both layers 1 and 5 into the hoof, and the latter afterward dressed, as usual. When the shoe is fastened in place, as stated, it will be understood that the edges of the layer 1 will be held in such close relation to the hoof as to form a tight joint, but the air will be permitted to enter at the heel portion and enter the pad 6 through the openings 3 after the pad has been compressed by the weight of the animal in stepping. When the hoof is brought down firmly on the surface over which the horse is traveling, the pad 6 is compressed and the air forced out through the openings 3 into the cavity 2, and from thence escapes at the rear. It will be understood, however, that the compression of the pad is not completely effected, and the tendency of the same to resume its normal position when the hoof is raised will cause an indrawing of the air or set up a suction, and thus in alternation the pad will be compressed and distended and concussion absorbed and prevented from affecting the legs and joints of the animal. It will also be seen that the operation of the pad will set up a beneficial circulation of air between the layer 1 and the bottom of the hoof, and the hoof will thus be prevented from sweating and becoming fetid. The pad will depend low enough to perform its function in connection with a shoe having calks thereon, and thus slipping will be obviated by the ordinary means employed for such purpose and a reliable foothold will at all times be provided. It is also well known that rubber in direct contact with the hoof of a horse or other animal is injurious and unhealthy, and by interposing the leather layer 1 in the present construction this disadvantage is entirely overcome.

The improved pad as an entirety is easily constructed and is of a durable nature, and in addition to the obvious prevention of collection and congregation of any kind of material against the frog and on the bottom of the hoof and the other advantages heretofore set forth the use of the device will disclose many other advantages in curing defects found in different animals, and it is obvious also that changes in the form, size, proportions, and minor details may be restored to without departing from the principle of the invention.

Having thus described the invention, what is claimed as new is—

A hoof-pad comprising an upper layer or thickness of leather with a central depressed cavity having a plurality of openings therethrough and congregated close to the center to leave a closed portion around the same and the margin of the cavity to form a seat for an air-chamber directly under the frog of the hoof of the animal to which it is applied, the portion of the layer surrounding the cavity being horizontally flat, and a lower rubber layer secured to the under side of the said leather layer to form a seat for a shoe, the central portion of said rubber layer immediately under the cavity of the leather layer being formed into a depending hollow closed pad completely open at the top.

In testimony that I claim the foregoing as my own I have hereto affixed my signature in the presence of two witnesses.

CHARLES S. CARKIN.

Witnesses:
JAMES H. SPENCER,
C. WALDO.